US007284310B2

(12) United States Patent
Jones et al.

(10) Patent No.: US 7,284,310 B2
(45) Date of Patent: Oct. 23, 2007

(54) METHOD OF MANUFACTURING A SEAL AND RESTRAINING SYSTEM

(75) Inventors: Jim Jones, Aledo, TX (US); Bradford G. Corbett, Jr., Ft. Worth, TX (US); Gerardo Darce, Heredia (CR); Randall Chinchilla, San Jose (CR)

(73) Assignee: S & B Technical Products, Inc., Fort Worth, TX (US)

( * ) Notice: Subject to any disclaimer, the term of this patent is extended or adjusted under 35 U.S.C. 154(b) by 339 days.

(21) Appl. No.: 11/120,550

(22) Filed: May 3, 2005

(65) Prior Publication Data

US 2006/0119100 A1 Jun. 8, 2006

Related U.S. Application Data

(60) Provisional application No. 60/633,888, filed on Dec. 7, 2004.

(51) Int. Cl.
*B23P 11/00* (2006.01)
(52) U.S. Cl. ............................ 29/447; 29/450; 29/453; 285/374; 277/314; 277/626
(58) Field of Classification Search .................. 29/447, 29/450, 453, 505, 522.1; 285/306, 307, 374; 277/314, 626
See application file for complete search history.

(56) References Cited

U.S. PATENT DOCUMENTS

| 4,572,523 | A | * | 2/1986 | Guettouche et al. | ........ 277/616 |
| 4,693,483 | A | * | 9/1987 | Valls | .......................... 277/626 |
| 4,826,028 | A | * | 5/1989 | Vassallo et al. | ............. 277/615 |
| 5,988,695 | A | * | 11/1999 | Corbett, Jr. | ................. 285/110 |
| 6,152,494 | A | * | 11/2000 | Corbett et al. | .............. 285/110 |
| 6,488,319 | B2 | | 12/2002 | Jones | ......................... 285/374 |

FOREIGN PATENT DOCUMENTS

EP 0 748 973 12/1996

* cited by examiner

*Primary Examiner*—Jermie E. Cozart
(74) *Attorney, Agent, or Firm*—Charles D. Gunter, Jr.

(57) ABSTRACT

A method and apparatus for restraining pipe against both internal and external forces at a pipe or fitting connection and to join and seal at least two pipes to form a pipeline is shown featuring an improved restraining and sealing mechanism. The restraining and sealing mechanism includes a circumferential housing and a companion sealing ring which are received within a mating groove provided in the belled end of a female pipe. The circumferential housing has an interior region which contains a gripping ring insert. The sealing ring and housing are integrally located within a belled pipe end during belling operations.

11 Claims, 6 Drawing Sheets

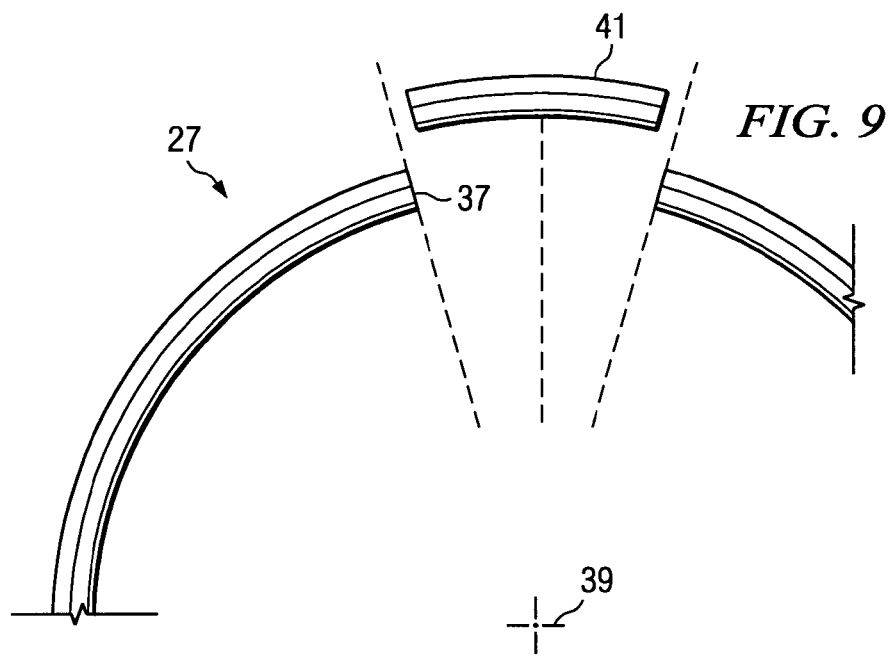
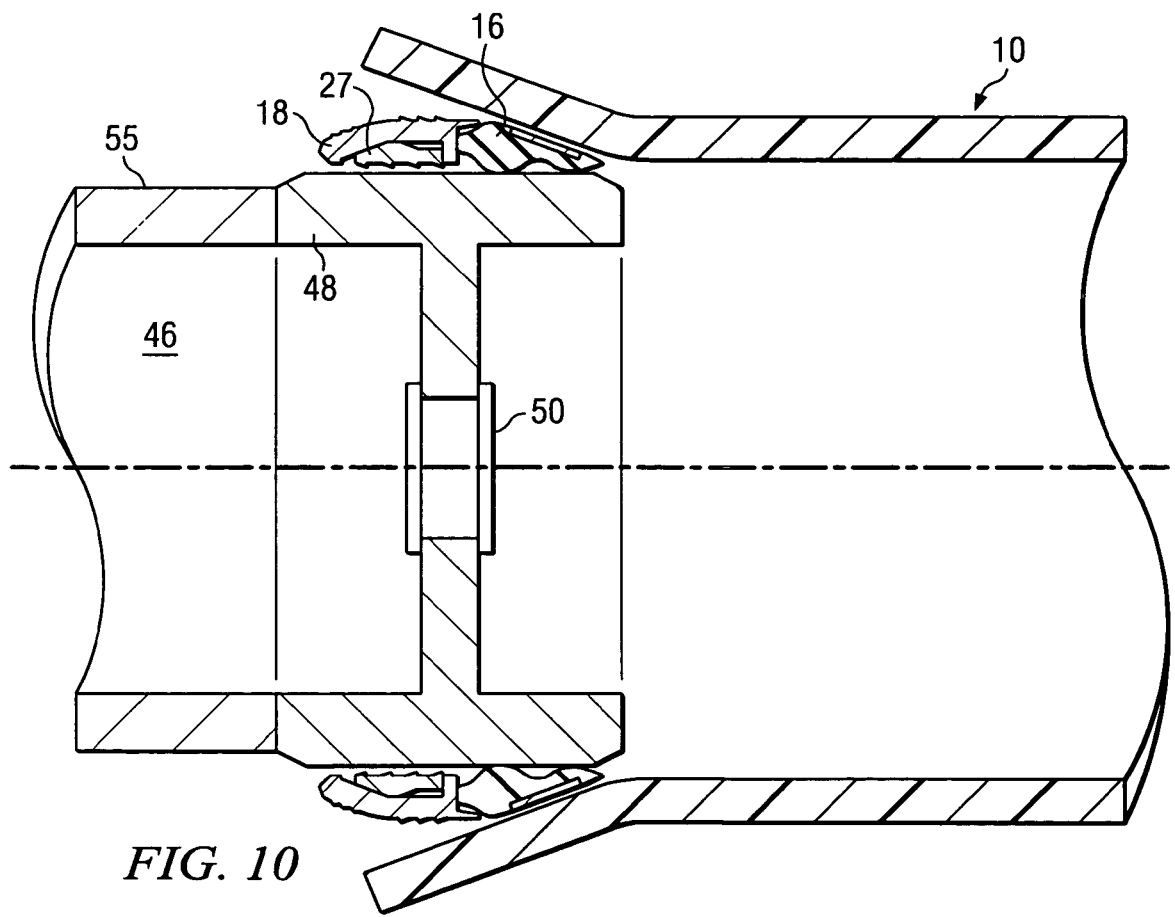

METHOD OF MANUFACTURING A SEAL AND RESTRAINING SYSTEM

CROSS REFERENCE TO RELATED APPLICATIONS

The present application claims priority from earlier filed provisional application Ser. No. 60/633,888, filed Dec. 7, 2004, entitled "Combination Seal and Restraint System for Plastic Pipe," by Bradford G. Corbett, Jr., and Jim Jones.

BACKGROUND OF THE INVENTION

1. Field of the Invention

The present invention relates generally to the field of pipe connections, and in particular, to a dual function, self restraining sealing system that is used to form a secure pipe connection between two plastic pipes and to a method of manufacturing the same.

2. Description of the Related Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

It is well known in the art to extrude plastic pipes in an elongated cylindrical configuration of a desired diameter and to then cut the extruded product into individual lengths of convenient size suitable for handling, shipping and installing. Each length of pipe is enlarged or "belled" at one end sufficiently to join the next adjacent pipe section by receiving in the female, belled end the unenlarged or "spigot" male end of the next adjacent length of pipe. The inside diameter of the bell is formed sufficiently large to receive the spigot end of the next section of pipe with sufficient clearance to allow the application of packing, caulking, elastomeric gaskets or other sealing devices designed to prevent leakage at pipe joints when a plurality of pipe lengths are joined to form a pipeline.

During a standard installation of a pipeline, in, for example, municipal installations, the joints between pipes and between pipes and fittings must be restrained to accommodate varying pressures as well as environmental influences. For example, there are various types of fitting connections which are commercially available and which are used in, for example, the waterworks industry. In one type of connection, the current restraint mechanism is an external clamping device which is totally separated from the sealing function. Thus, a separate mechanism must perform the sealing function. In another type of fitting connection, a gasket performs the sealing function. However, it is necessary that an external means must compress the gasket by mechanical action such as T-bolts. Most current restraining systems offered in the industry require a substantial amount of labor to install. Under most installation conditions, the restraining systems are cumbersome to install and represent a substantial additional effort for the contractor. As a result, these and other traditional restraining mechanisms of the prior art add considerable cost and complexity to the pipe installation as well as adding the possibility of human error depending upon the specific field conditions and applications.

In the early 1970's, a new technology was developed by Rieber & Son of Bergen, Norway, referred to in the industry as the "Rieber Joint." The Rieber system provided an integral sealing mechanism within the belled or female pipe end for sealing with the spigot end of a mating pipe formed from thermoplastic material. In the Rieber process, the elastomeric gasket was inserted within an internal groove in the socket end of the female pipe as the female or belled end was simultaneously being formed. The provision of a pre-stressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682. While the Rieber process provided an improved sealing system for plastic pipelines of the type under consideration, it did not include any integral restraint type mechanism.

Accordingly, there is a need for a cost-effective, easy to manufacture and use combination seal and restraint system for restraining and sealing plastic pipe against internal and external forces at a pipe or fitting connection and for joining and sealing at least two plastic pipes at a pipe joint to form a pipeline.

There also exists a need for such a sealing and restraint system in which the restraint mechanism is integral to the groove formed in the bell end opening of a female pipe member which member receives a mating male, spigot pipe end to form a pipe joint in a fluid conveying pipeline.

There is also a need for such a combination seal and restraint system in which the restraint portion of the system works independently of the seal and can accept differing seal profiles.

There also exists a need for such a combination seal and restraint system in which the seal portion works in complimentary fashion to enhance the action or energize the restraint portion of the mechanism.

There exists a need for such a seal and restraint system having all internal components so that problems with corrosion of external metallic components are eliminated.

There exists a need for such a seal and restraint system which is comprised of components which can be mounted on a forming mandrel and which can be belled over in a Rieber style manufacturing operation.

SUMMARY OF THE INVENTION

It is therefore an object of the present invention to provide a seal and restraint system in which the restraint mechanism is integral to the groove formed in the bell end opening of a female pipe member which member receives a mating male, spigot pipe end.

It is a preferred object of the invention to provide an improved seal and restraint system for plastic pipe joints utilizing a Rieber style "gasket formed" bell groove, which does not require assembly in the field and which thus simplifies installation of pipe sections at the pipe joints used to form a fluid conveying pipeline, thereby reducing the chance of human error or of damage or contamination of the gasket sealing surfaces.

Another object is to eliminate the need for an external clamping device of the type presently used in the industry to achieve the restraining function, which device is totally separated from the sealing function and which typically utilizes metallic components which are subject to corrosion over time.

Another object of the present invention is to provide an improved restraint system for plastic pipe which is simple in design and dependable in operation and which is less costly in terms of both materials and labor than the restraining systems presently employing external mechanical restraints.

In the method and apparatus of the invention, an integral bell pipe-to-pipe seal and restraint system is provided for restraining pipe against internal or external forces at a pipe coupling or fitting connection and for joining and sealing at least two pipes to form a pipeline. The seal and restraint system of the invention utilizes an elastomeric sealing ring in conjunction with a special cooperating restraint mechanism. The restraint mechanism is designed to work independently but in complimentary fashion with the seal and can accept different seal profiles. Alternatively, the seal and the restraint mechanism may be bonded or otherwise formed together so that they are handled as a single piece. The bonding may be intentionally weak so that the seal detaches from the restraint mechanism during the belling operation or during use.

In a particularly preferred form of the invention, the restraint mechanism includes a ring shaped housing having a circumferential housing interior. The ring shaped housing is positioned on the exterior of a forming mandrel and the pipe bell end is formed over the housing in a Rieber style belling operation. A companion ring-shaped gripping insert is provided which can be installed and contained within a circumferential region provided in the housing interior. The ring-shaped gripping insert preferably has at least one circumferential slit in the circumference thereof which allows it to be installed after the female plastic pipe end is belled over the housing. The ring is temporarily compressed and snapped or popped within the circumferential region provided in the housing interior. The gripping insert also has one or more rows of gripping teeth on an interior surface thereof.

Alternatively, the gripping insert can be installed within the housing as a part of the belling operation with a removable spacer being temporarily placed in the circumferential slit in the gripping insert, whereby the gripping insert is spread apart an additional, preselected amount. The housing and gripping insert are then installed on the forming mandrel. The amount of spacing is selected to cause the gripping insert to be initially received more closely within the housing interior region, whereby the teeth of the gripping insert are concealed in the housing interior region and do not make detrimental contact with an associated forming mandrel during the belling operation.

Using the latter technique, both the seal and the restraint mechanism are loaded onto a forming mandrel, typically at a receiving groove on the mandrel exterior. The heated pipe end of a female plastic pipe is forced over the mandrel exterior and, in turn, over the seal and housing of the restraint mechanism. The heated pipe end is then cooled and the belled pipe end containing the housing and gripping insert is withdrawn from the forming mandrel. The removable spacer may remain in position in the gripping insert during storage of the belled pipe end. The spacer is typically removed before the assembly of a pipe joint in the field in order to activate the restraining mechanism. The spacer may also be intentionally left in place to deliberately disable the restraint mechanism.

Since the female end of the plastic pipe is belled around the seal and at least the ring shaped housing of the restraining mechanism, the restraint system is integral with the bell. In this way, it is not necessary to install the restraint system in the field and, since the system is also locked in position at the factory by means of the belling operation, it is less likely to be dislodged or twisted during assembly of the pipe joint.

In the preferred embodiment of the invention, the plastic pipe is made of PVC. The preferred materials for the ring shaped housing and gripping ring insert include materials selected from the group consisting of metals, composites and rigid elastomers or plastics. The preferred sealing ring is formed from a material selected from the group consisting of natural and synthetic rubbers and elastomers, polymeric plastics and composites. The spacer for the gripping ring is preferably formed of a suitable plastic.

The above as well as additional objectives, features, and advantages of the present invention will become apparent in the following detailed written description.

BRIEF DESCRIPTION OF THE DRAWINGS

FIG. 9 is a top view of the gripping insert of FIG. 8 showing the slit in the circumference thereof and showing a removable spacer about to be fitted within the gap.

FIG. 10 is a side, partially schematic view of one version of a forming mandrel used with the seal and restraint system of the invention.

DETAILED DESCRIPTION OF THE PREFERRED EMBODIMENT

Figure 1:
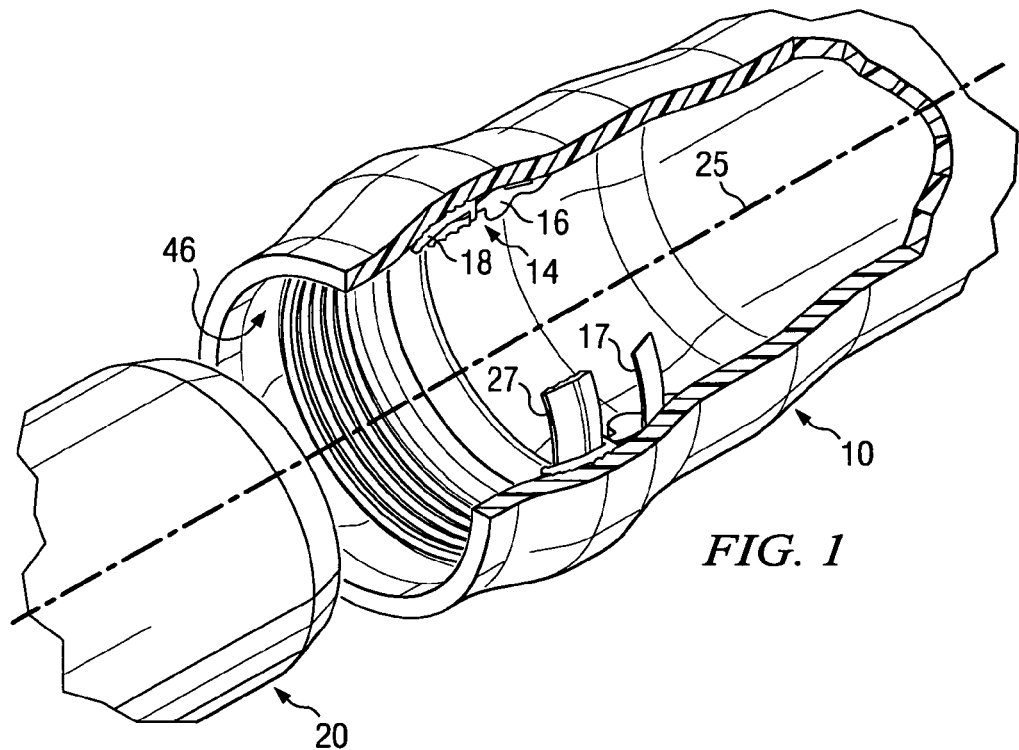
FIG. 1 is a perspective view, partly broken away, of male and female pipe sections about to be made up into a pipe coupling, the belled end of the female pipe section showing one embodiment of the seal and restraint mechanism of the invention in place within a mating groove provided therein.

Turning to FIG. 1, there is shown an exploded view of a plastic pipe joint in which a belled female pipe end 10 is provided with an annular groove (shown as 12 in FIG. 2A) for receiving the seal and restraint mechanism 14 of the invention. The improved integral seal and restraint mechanism of the invention is capable of joining and sealing the female plastic pipe 10 to the spigot end of a mating male plastic pipe section 20 having an exterior surface 24. The plastic pipe male and female ends 10, 20 can be made from any convenient synthetic material including the polyolefins such as polyethylene and polypropylene but are preferably made from polyvinyl chloride (PVC).

Figure 2A:
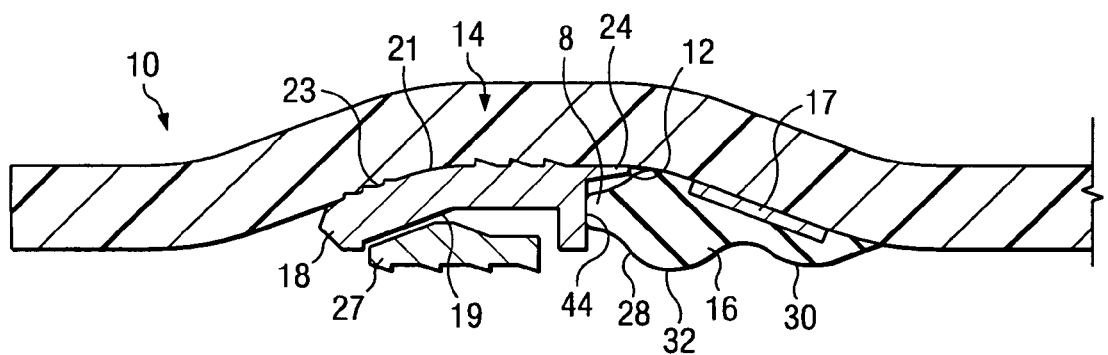
FIG. 2A is a side, cross-sectional view of a portion of the female pipe section showing the seal and restraint system of FIG. 1 in greater detail.
Figure 2B:
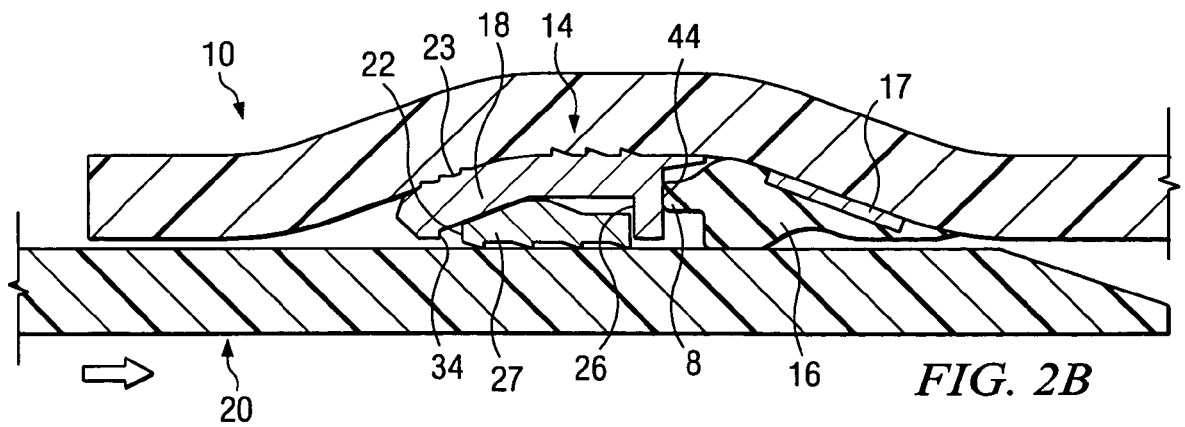
FIG. 2B is a view similar to FIG. 2A, but showing the beginning step of inserting the male pipe section within the female, belled pipe end, the male and female pipe sections being joined to form a secure connection.

As best seen in FIGS. 1, 2A and 2B, the seal and restraint mechanism 14 includes an elastomeric, circumferential sealing ring 16 which is formed as an elastomeric body. The annular sealing ring 16 is somewhat tear drop shaped in cross section and includes a bulbous end region 28 (FIG. 2A) and a thinner forward most region 30. The bulbous end region 28 terminates in a nose portion 8. The sealing portion also has an exposed exterior region (generally at 32) which contacts the exterior surface 24 (FIG. 2B) of the mating male pipe section upon assembly of the joint. The sealing member is preferably made of a resilient elastomeric or thermoplastic material. The sealing member can be formed, for example, from natural or synthetic rubber, such as SBR, or other elastomeric materials which will be familiar to those skilled in the plastic pipe arts such as EPDM or nitrile rubber. In this case, the sealing ring 16 has a metal reinforcing band 17 about the outer circumference thereof. However, as will be apparent from the description which follows, any number of specialized sealing rings can be utilized in order to optimize the sealing and restraining actions of the assembly.

The seal and restraint system of the invention also includes a companion restraint mechanism for the sealing ring 16 which allows movement of the mating male pipe (20 in FIG. 1) relative to the belled end of the female pipe 10 in a first longitudinal direction but which restrains movement in a second, opposite relative direction. The companion restraint mechanism includes a ring shaped housing 18 (FIG. 2A) having a circumferential interior region 19 and an exterior 21. The ring shaped housing provides radial stability and reinforcement for the male (spigot) pipe end during make up of the joint so that the male pipe end 20 is radially supported and remains perfectly circular during the joint assembly process. The exterior 21 extends from a nose region 22 (FIG. 2B) in convex fashion, gradually flattening out into a planar back region which terminates in a tip region 24. The tip region 24 serves as a protective skirt which covers any gap between the sealing ring 16 and ring shaped housing 18 during the pipe belling operation. Although the housing could have a circumferential opening, it is preferably provided as a solid ring of a slightly larger internal diameter than the forming mandrel (to be described) upon which it is received during pipe belling operations. Alternatively, the housing could be used with some form of collapsible forming mandrel, in which case its internal diameter might approach or exceed that of the mandrel in certain of its states of operation. The exterior 21 of the housing 18 may be equipped with one or more rows of gripping teeth 23 for engaging the surrounding pipe groove 12. The corresponding grooves or indentations in the pipe interior would be formed during the belling operation as the pipe cools. The ring shaped housing 18 is preferably formed of a material selected from the group consisting of metals, alloys, elastomers, polymeric plastics and composites and is rigid or semi-rigid in nature.

The leading portion of the circumferential interior region 19 is sloped upwardly with respect to the longitudinal axis (25 in FIG. 1) of the pipe. This leading portion 19 forms an upwardly sloping ramp surface for a companion gripping insert 27. The sloping ramp surface extends upwardly from a positive stop region (34 in FIG. 2B) and gradually flattens into a planar circumferential region which terminates in an internal shoulder (26 in FIG. 2B) arranged opposite an external shoulder 44. The positive stop region 34 prevents the companion gripping insert 27 from overly compressing the O.D. of the mating male pipe as the pipe joint is being assembled.

The housing external shoulder (44 in FIGS. 2A and 2B) is substantially perpendicular to the longitudinal axis 25 of the female pipe. The external shoulder 44 is in contact with the nose region of the elastomeric body of the sealing ring 16 as the mating male pipe is inserted into the mouth opening (46 in FIG. 1) of the female belled pipe end 10. The housing and sealing ring can be provided as separate pieces, as shown in FIGS. 2A and 2B, or can be at least temporarily joined at a juncture point prior to the pipe belling operation. For example, a suitable glue or adhesive could be used to form a temporary juncture at the external shoulder 44 of the housing 18. In such case, the temporary juncture would typically be designed to be severed during the belling operation so that the sealing ring 16 and the housing 18 are separate at the time a pipe joint is made up in a field application. The housing 18 could also be integrated with the sealing ring 16, as during the curing of the elastomeric body of the ring.

Figure 8:
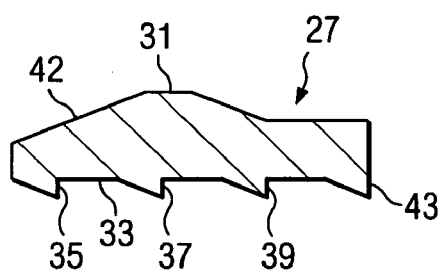
FIG. 8 is an isolated view of the gripping insert which is received within the circumferential interior region of the housing in the restraint system of the invention.

FIGS. 2A and 2B illustrate the positioning of the companion ring-shaped gripping insert 27 which is received in complimentary fashion and contained within the circumferential interior region 19 of the housing 18. As shown in FIGS. 2A and 2B, the nose region 22 of the gripping insert 27 contacts the positive stop region 34 on the I.D. of the housing 18 in the forward most position to thereby assist in retaining the gripping insert within the housing. The gripping insert 27 has an exterior surface 31 (FIG. 8) and an interior surface 33 with at least one row of gripping teeth 35. In the embodiment of the invention shown in FIG. 8, the gripping insert 27 has four rows of teeth 35, 37, 39 and 43. The rows of teeth are arranged for engaging selected points on the exterior surface 24 of the mating male pipe section 20.

The gripping insert exterior surface 31 has a sloping profile (42 in FIG. 8) which contacts the upwardly sloping ramp surface (generally at 19 in FIG. 2A) of the housing 18, whereby contact with the exterior surface of a mating male pipe (20 in FIG. 2B) causes the gripping insert 27 to ride along the male pipe exterior surface at an angle while the row of gripping teeth on the gripping insert internal surface engage the exterior surface of the mating male pipe.

Figure 7:
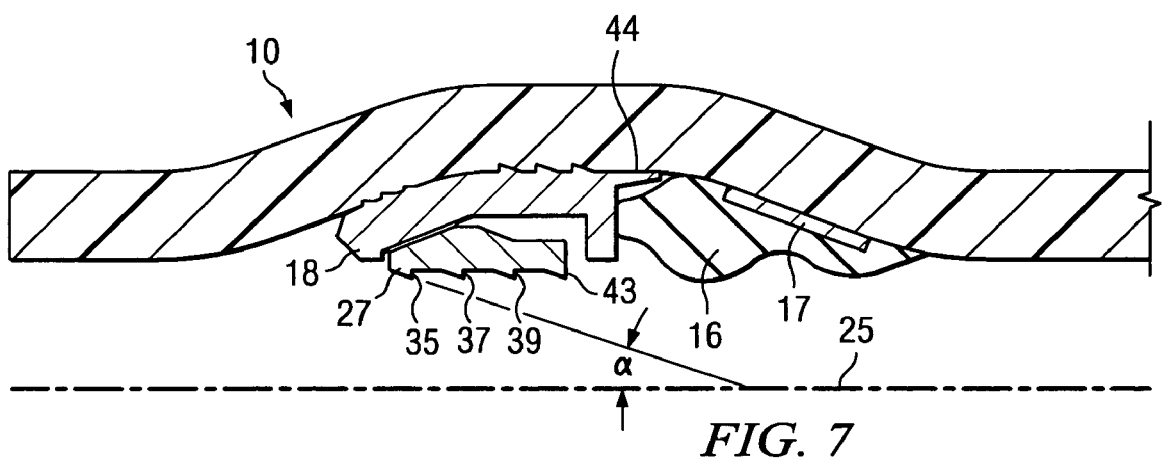
FIG. 7 is an enlarged, side cross-sectional view of the seal and restraint system of the invention showing certain aspects of the geometry thereof.

The rows of teeth 35, 37, 39, 43 on the lower surface 33 of the ring shaped insert 27 can be of equal length or can vary in length and can be arranged in either a uniform or non-uniform pattern about the inner circumference of the gripping insert. The teeth of the gripping insert are also angled away from the horizontal axis of the joint (25 in FIG. 7) at an angle "α" of less than 90°.

As best seen in FIG. 9, the gripping insert has at least one slit 37 in the circumference thereof which forms an opening of approximately 15° with respect to the central axis 39, as viewed in FIG. 9, for the particular size insert in question. The gripping insert 27 is a rigid or relatively rigid member. By "relatively rigid" is meant that the gripping insert 27 can be formed of a hard metal, such as corrosion resistant stainless steel, or from other metallic materials or alloys or even a hardened plastic or composite.

Figure 12:
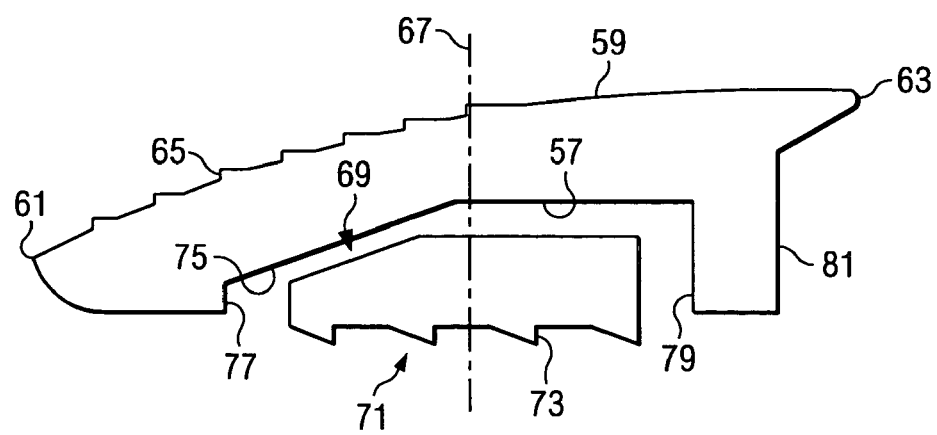
FIG. 12 is a side, cross-sectional view similar to FIG. 2A, but showing an alternate ring shaped housing and gripping insert of the invention.
Figure 13:
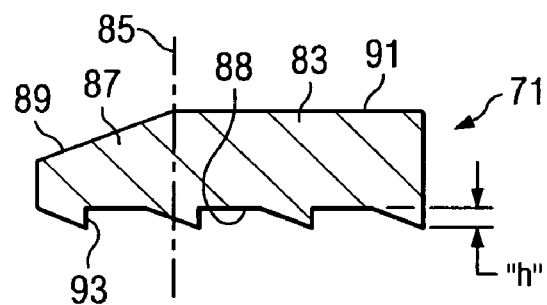
FIG. 13 is an isolated cross-sectional view of the gripping insert of FIG. 12.
Figure 14:
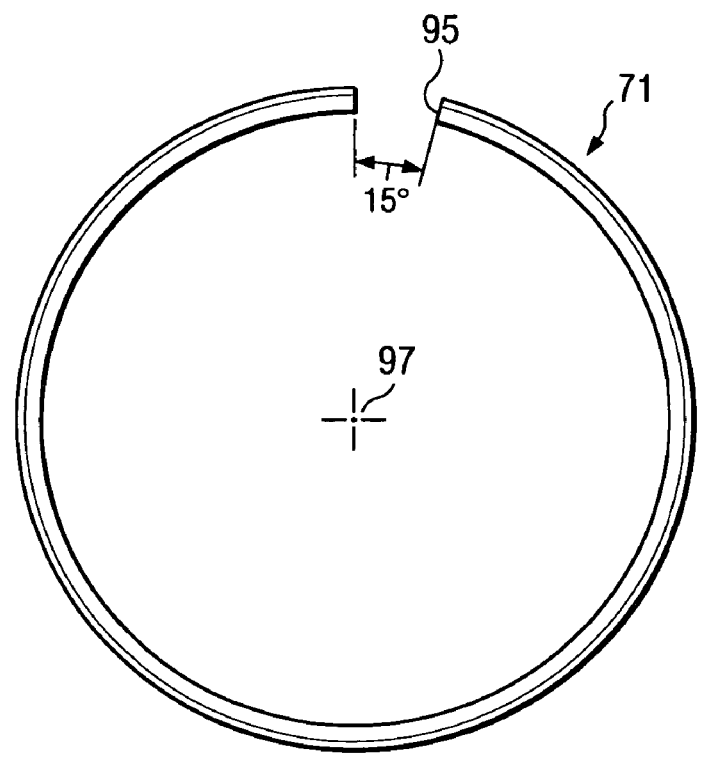
FIG. 14 is a top view of the gripping insert of FIG. 12.

FIGS. 12-14 illustrate another version of the housing and gripping insert of the invention. The ring shaped housing 55 in FIG. 12 again has a circumferential interior region 57 and an exterior 59. The exterior 59 extends from a nose region 61 in convex fashion, gradually flattening out into a planar back region which terminates in a tip region 63. Unlike the housing 18 shown in FIG. 2A, the housing 55 of FIG. 12 has the rows of exterior teeth 65 all moved forward of a central vertical axis 67. The placement of the teeth 65 has been found to more effectively counteract the opposing force of the pressurized pipe in use which would otherwise tend to cause the pipe joint to be forced apart and to cause the restraint mechanism to be squeezed through the resulting gap. The space indicated generally at 69 in FIG. 12 is intended to illustrate that the preferred gripping ring insert 71 is now dramatically smaller in diameter than the male spigot pipe end. This difference in ring diameter effectively means that the male spigot pipe end must expand the gripping ring insert 71 as the pipe joint is being assembled. As a result, there is some drag on the pipe exterior during installation which facilitates the biting and gripping action of the gripping insert teeth 73.

As shown in FIG. 12, the housing circumferential interior region 75 again slopes upwardly with respect to the pipe longitudinal axis with the leading portion thereof forming an upwardly sloping ramp surface for a companion ring shaped gripping insert 71. The sloping ramp surface extends upwardly from a positive stop region (77 in FIG. 12) and gradually flattens into a planar circumferential region which terminates in an internal shoulder 79 arranged opposite external shoulder 81. The positive stop region 77 prevents the gripping insert ring 71 from tending to over-compress the mating male plastic pipe section during assembly of the pipe joint. As a result of the interaction of the gripping insert ring 71 and the stop region 77, there is no point loading or pipe distortion during assembly. While point loading may not be a significant factor in ductile iron systems, it can be a critical factor in ductile iron to plastic systems.

FIG. 13 illustrates the different geometry of the gripping ring insert 71. As will be apparent from the cross-section, the gripping insert 71 has a generally rectangular cross-sectional region 83 to the rear of a vertical axis 85 and a conically shaped cross-sectional leading region 87 forward of the axis 85. The O.D. of the insert 71 has a sloping nose region 89 which joins a cylindrical outer surface 91. The interior circumference 88 has a plurality of rows of gripping teeth, such as row 93 in FIG. 13. In the embodiment of the device illustrated in FIG. 13, the rows of teeth are evenly spaced and the height of the teeth (indicated as "h" in FIG. 13) in each row is identical. As best seen in FIG. 14, the gripping insert has at least one slit 95 in the circumference thereof which forms an opening of approximately 15° with respect to the central axis 97, for the particular size insert in question.

The modified design of the gripping insert 71 tends to concentrate the contact force during assembly of the pipe joint on the leading teeth (93 in FIG. 13). As the teeth begin to sink into the exterior surface of the mating male pipe, the insert tends to recover its original posture, so that all of the rows of teeth tend to produce the same indentation. By using the ring geometry shown in FIG. 13 and by increasing the interference between the ring and the male pipe (by decreasing the diameter of the gripping insert), contact force can be concentrated on the leading row of teeth 93, even where all the rows of teeth are of the same size or height. As a result, once the gripping portion of the restraint mechanism is activated, all of the teeth have virtually the same penetration into the male pipe.

Because the preferred restraint system of the invention utilizes two components, namely the sealing ring and the rigid gripper ring, the sealing ring can actually serve to pre-load or energize the gripper ring so that the ring is more firmly engaged on the exterior surface of the male pipe section. This can be accomplished, for example, by intentionally providing an excess amount of rubber in the sealing ring over that normally provided to perform the sealing function alone so that the sealing ring bears against the gripper ring and creates a positive loading effect.

FIGS. 1, 2A and 2B also illustrate the make-up of a joint of plastic pipe in which the male spigot end 20 is inserted within the belled female pipe section 10. FIG. 2B illustrates the gripping action of the rows of teeth 35, 37, 39, 43 of the gripping insert in which the teeth grip the exterior surface 24 of the male pipe section 18. The rows of teeth 35, 37, 39, 43 are angled inwardly with respect to the axis 25 so that contact with the male pipe end (20 in FIG. 2B) causes the teeth to be deflected in a counterclockwise direction with respect to axis 25 during the insertion step, as viewed in FIG. 2B. Once the male pipe section 18 has been fully inserted, the rows of teeth 35, 37, 39, 43 grip the exterior surface of the male pipe and resist movement in an opposite longitudinal direction. The nose region 8 of the sealing ring 16 also contacts and forms a sealing region with respect to the external shoulder 44 of the housing 18.

In order to explain the manufacturing process used to locate the seal and restraint system of the invention within the mating groove provided in the female pipe end 10, it is necessary to briefly explain the prior art "Rieber" process for plastic pipe manufacture. That was briefly described in the Background of the Invention. As previously described, in the Rieber process, the elastomeric gasket was installed within a simultaneously formed internal groove in the socket end of the female pipe during the pipe belling process. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion.

While the Rieber process provided an integral sealing gasket which was "prelocated" within the belled, female pipe end in a groove which was formed about the gasket, it did not provide any mechanical "restraining function" to prevent separation of the male and female pipe ends at the pipe connection once the pipe joint was made up.

Figure 3:
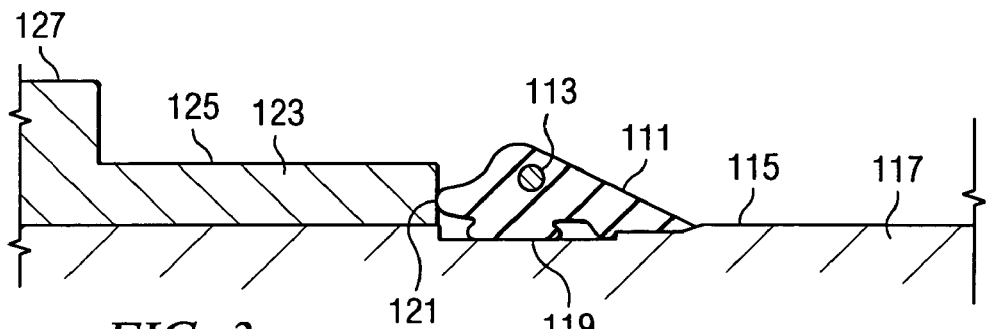
FIGS. 3-6 are simplified, schematic views of the prior art Rieber process used to form the female belled pipe end.
Figure 4:
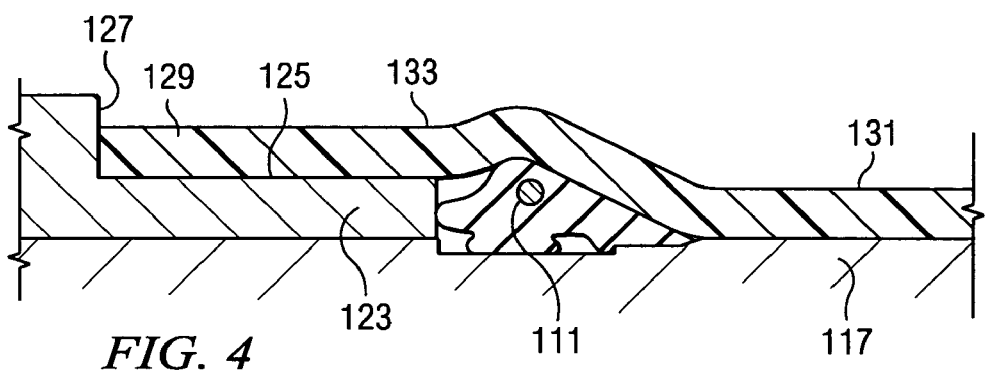
Figure 5:
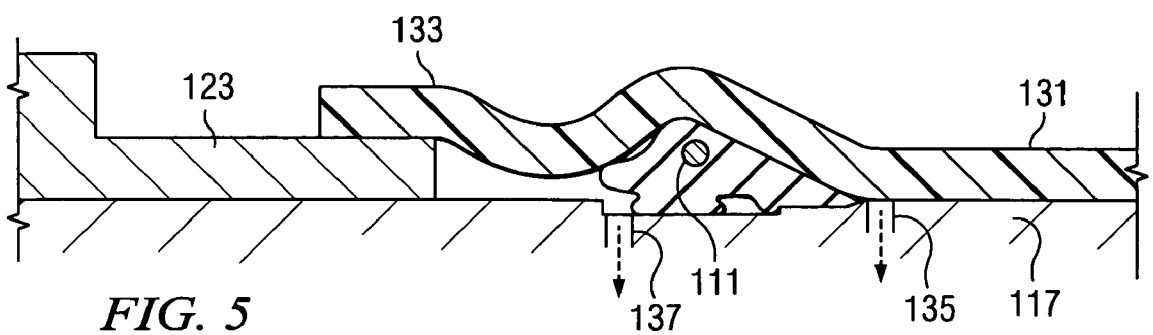
Figure 6:
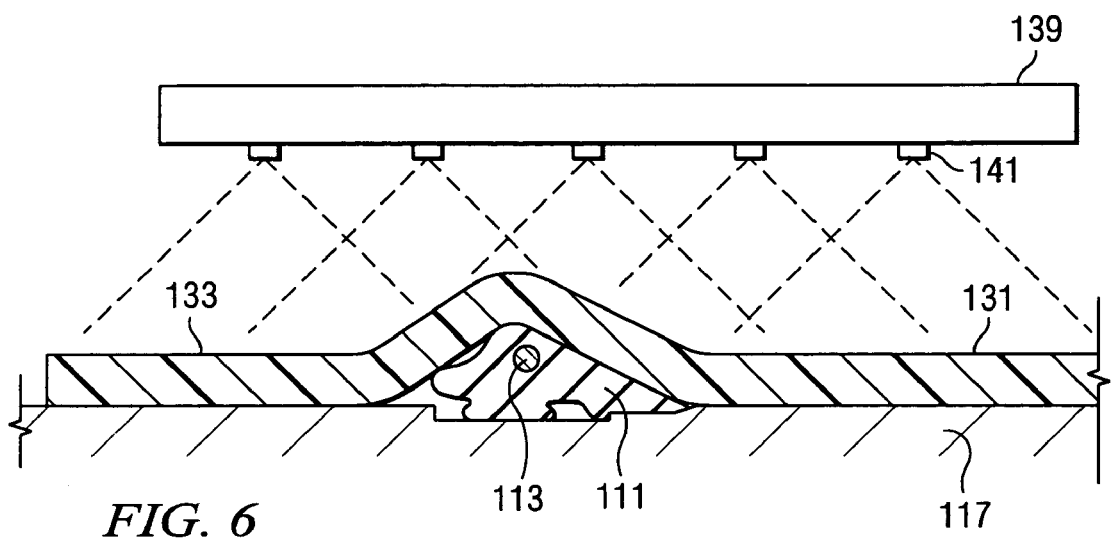

The relevance of the Rieber process to Applicant's invention can perhaps best be appreciated with reference to the description of the prior art process shown in FIGS. 3-6. FIG. 3 shows a section of a conventional elastomeric sealing gasket 111 having a steel reinforcing ring 113 in place on the generally cylindrical outer working surface 115 of the mandrel 117 used in the belling process. The elastomeric gasket 111 can be formed of, for example, SBR rubber and is a ring shaped, circumferential member having an inner compression surface 119 and an exposed nose portion 121 which, as shown in FIG. 3, abuts a forming collar 123. The forming collar 123 has a first generally cylindrical extent 125 which is joined to a second cylindrical extent 127 by a step region 129, whereby the second extent 127 is of greater external diameter than the first cylindrical extent 125, shown in FIG. 3.

In the first step of the prior art process, the steel reinforced elastomeric ring 111 is thus placed onto the working surface of the mandrel 117 and pushed to a position against the back-up or forming collar 123. In this position, the gasket is firmly anchored to the mandrel surface with the rubber between the mandrel and the steel-ring of the gasket being compressed by approximately 20%.

In the second step of the prior art process, the socket end 133 of the thermoplastic pipe 131 is heated and pushed over the steel mandrel 117, gasket 111 and back-up collar 123.

The socket end 133 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. However, the preferred material for this application is PVC due to its expansion and contraction characteristics. The socket end 133 flows over the first cylindrical extent 125 of the back-up collar 123 and abuts the step region 129 in the second step of the process. Note that the pipe end is deformed by the presence of the gasket 11 so that a gasket receiving groove is formed with the pipe I.D.

In the next step of the prior art process (FIG. 5) the mandrel and pipe move away from the back-up collar 123 and the pipe socket end 133 retracts around the mandrel and gasket 111 due to the elastic forces of the thermoplastic material. Typically, vacuum was also applied through ports 135, 137 which connected the mandrel working surface with a vacuum source (not shown). In the final step of the prior art process, the pipe socket end 133 is cooled by means of a water spray bar 139 and spray nozzles 141. As the cooling takes place, the pipe socket end 133 shrinks around the gasket 111, thus compressing the rubber body of the gasket between the steel reinforcing ring 113 and the socket-groove to establish a firm seal. The above described Rieber process has been in commercial use since the early 1970's and is described in the above referenced issued United States patents, among other sources. It will thus be well familiar to those skilled in the thermoplastic pipe sealing arts.

Applicant's seal and restraint mechanism differs from the above described Rieber process in that the system of the invention serves to provide both sealing and restraining functions. In the preferred embodiment, the system is comprised of two distinct components, the previously described sealing ring 16 and the housing 18 and companion gripping insert 27, rather than a single elastomeric component.

The method of installing the components of the restraining system of the invention will now be described. In the preferred method of installation, the sealing ring (16 in FIG. 2A) and ring shaped housing 18 are placed side by side on the forming mandrel (such as mandrel 117 in FIG. 3) and the female pipe end is heated and belled over these components in the normal fashion, as has been described with respect to the Rieber process. The backup collar position or the mandrel seating groove location and size may have to be adjusted for the resulting changes in bell dimensions, i.e., to allow enough room for the housing 18. Once the belled pipe end has been cooled and the forming mandrel has been retracted, the gripping insert 27 can be snapped or popped into position on the inner circumference of the housing 18, as shown in FIG. 2A.

It may also be possible to bell the female pipe end over the housing 18 with the gripping insert ring 27 already,in place on the inner circumference of the housing 18. For example, a removable spacer 41 in FIG. 9 can be temporarily placed in the circumferential slit 37 in the circumference of the gripping insert 27 once the insert has been installed in the housing. In this way, the ring shaped insert is spread apart an additional, preselected amount once the insert is received within the circumferential interior region 19 of the housing 18. As a typical example, for a ring shaped insert 27 in FIG. 9 having an internal diameter of about 348 mm, the insertion of the spacer 41 opens the 15° opening 37 out to about a 21° opening. At the same time, the gripping insert 27 is pushed deeper into the interior region 19 of the housing 18. The amount the gripping insert 27 is spaced apart is selected to cause the gripping insert to be initially received more closely within the housing circumferential interior region 19, whereby the teeth 35 of the insert are initially concealed in the housing circumferential interior region 19. This placement of the spacer 41 in the slit or opening 37 helps to prevent the insert from making detrimental contact with an exterior surface of a forming mandrel during subsequent belling operations.

Thus, it may be possible, in some circumstances, to bell the female pipe end about the seal and restraint system as described in FIGS. 3-6 by using the previously described removable spacer 41. However, because the seal and restraint system of the invention includes two component parts, namely the resilient sealing ring and the companion rigid housing and gripping insert, it may not be possible to easily slide the companion components over the belling mandrel exterior surface as in the traditional "Rieber style" manufacturing process. The presence of the rigid housing 18 may also necessitate that more specialized design features be incorporated into the forming mandrel, such as the use of a "collapsible mandrel."

Figure 11:
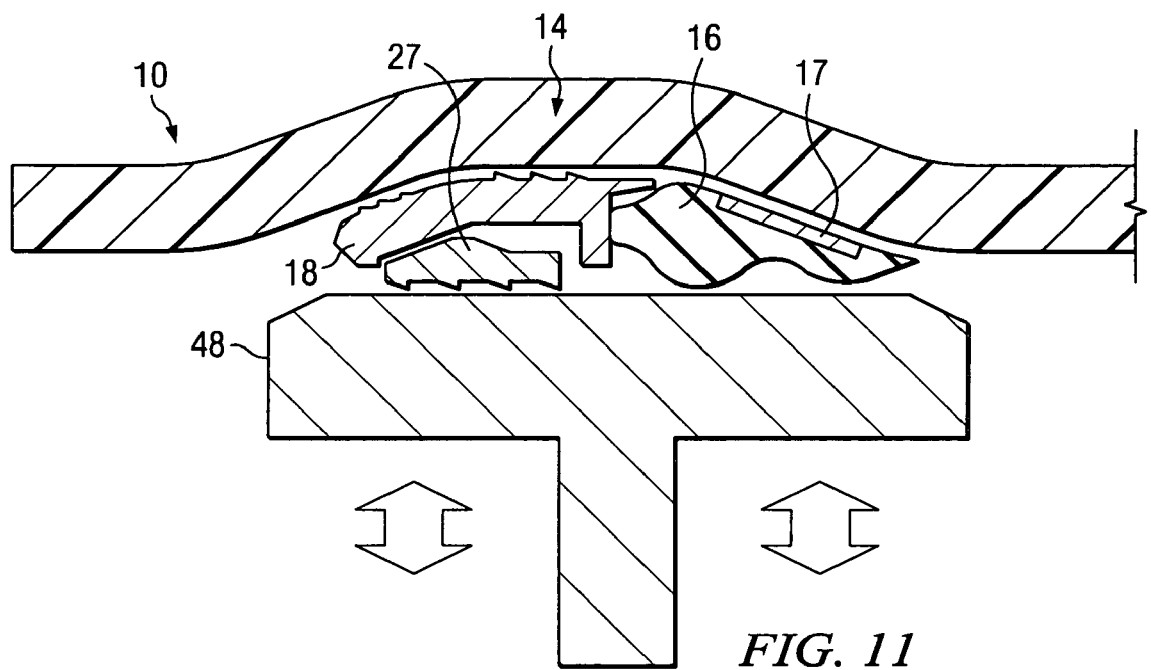
FIG. 11 is a close-up view of a portion of the mandrel of FIG. 10 showing the collapsible surfaces thereof.

FIGS. 10 and 11 illustrate, in simplified fashion, an alternative installation operation in which a working mandrel is provided with an outer, generally cylindrical working surface 55 and collapsible elements 48. The components 16, 18 can be positioned on the forming mandrel by temporarily collapsing the elements 48. Once the components are in position, the elements 48 are extended. After the heated pipe end is forced over the mandrel and expanded over the seal and restraint components 16, 18, the pipe end is cooled. The mandrel elements are collapsed inwardly by means of the actuating mechanism 50 and the mandrel is then removed from the pipe. FIG. 11 is intended to illustrate the relative movements of the mandrel elements 48, in simplified fashion. Pipe forming mandrels featuring collapsible elements are known generally by those skilled in the pipe forming arts. For example, see U.S. Pat. No. 4,239,473 for an example of a collapsible mandrel and U.S. Pat. No. 4,643,658 for an example of a "ramp" style forming mandrel.

Because the pipe joints of the invention incorporate both a sealing member and a separate gripping member, they depart from the teaching of the prior art Rieber belling process. However, as in the Rieber manufacturing process described above, the preferred seal and restraint mechanism of the invention is integrally belled in the female pipe end during manufacture of the bell end. Thus, the seal and restraint mechanism of the invention can be installed and prelocated within a mating pipe groove in the "Rieber style", with the exception that it may be necessary to use a "collapsible mandrel" or a "ramp" style mandrel to accommodate the housing or gripping insert which are positioned on the exterior of the forming mandrel in some circumstances. Also, while the invention has been described with reference to a single internal groove formed within the female bell pipe end, it will be understood that two or more grooves can be formed in the bell pipe end, either mechanically at the factory prior to installing the restraining system components, or in the Rieber fashion so that the grooves are simultaneously formed about the restraining system positioned on the forming mandrel.

An invention has been provided with several advantages. The present invention provides a sealing and restraint system in which the restraint mechanism is integral to the groove formed in the bell end opening of a female pipe member. The restraining mechanism may be provided as a part of a "gasket formed" bell groove, as in a Rieber style pipe belling operation where the groove is simultaneously formed as the bell pipe end is formed. In its most preferred form, the manufacturing method and device of the invention provide an improved seal and restraint system for plastic pipe joints utilizing the "gasket formed" bell groove, which does not require assembly in the field and which thus simplifies installation of pipe sections at the pipe joints used to form a fluid conveying pipeline.

The integral restraint system of the invention eliminates the need for an external clamping device of the type presently used in the industry to achieve the restraining function, which device is totally separated from the sealing function. This eliminates the possibility of external corrosion of the metallic components of the prior art external restraints. The system of the invention is also simple in design, dependable in operation, and is less costly to manufacture than the prior art restraining systems which utilize external glands and mechanical restraint components. Because the ring components of the restraint system of the invention are pre-installed, the possibility of mistakes during field assembly is virtually eliminated. Also, the gripping insert component of the invention applies more pressure to the exterior surface of the mating male spigot pipe end as internal pressure builds within the fluid coupling. This action helps to ensure the integrity of the joint. In addition, the gripping ring component aids in sealing the joint by keeping a constant gripping pressure on the male pipe end at even the lowest operating pressures of the pipeline.

While the invention has been shown in only one of its forms, it is not thus limited but is susceptible to various changes and modifications without departing from the spirit thereof.

What is claimed is:

1. A method of manufacturing a seal and restraining system for joining and sealing a male plastic pipe to a mating female belled pipe end, the method comprising the steps of:
   providing a forming mandrel having an inner end and an outer end and having an outer working surface;
   locating a sealing ring and a companion ring shaped housing at a first circumferential position on the outer working surface of the mandrel, the ring shaped housing having a circumferential interior region;
   forming a belled pipe end about the sealing ring and companion ring shaped housing; and
   wherein a ring shaped gripping insert is installed in the circumferential interior region of the housing, the gripping insert having an interior gripping surface with at least one row of gripping teeth for engaging an exterior surface of the male plastic pipe.

2. The method of claim 1, wherein the ring shaped gripping insert is provided with at least one circumferential slit in the circumference thereof which allows the gripping insert to be temporarily compressed and installed within the circumferential interior region of the housing in snap-fit fashion after the ring shaped housing has been integrally installed within the belled pipe end during manufacture of the female pipe.

3. The method of claim 1, wherein the ring shaped gripping insert is provided with at least one circumferential slit in the circumference thereof and wherein a removable spacer is temporarily placed in the circumferential slit in the gripping insert, whereby the gripping insert is spread apart an additional, preselected amount once the insert is received within the circumferential interior region of the housing.

4. The method of claim 3, wherein the gripping insert is located on the interior surface of the housing and is spread apart a preselected amount;
   wherein the housing containing the gripping insert and the companion sealing ring are located on the outer working surface of the mandrel;
   wherein the belled female pipe end is formed by first heating a female end of the plastic pipe and then forcing the heated female pipe end over the working surface of the mandrel and over the seal and companion housing, whereby the heated female end of the plastic pipe flows over both the seal and the housing to form a retention groove for the seal and housing; and
   thereafter cooling the female pipe to form a belled pipe end followed by retracting the belled pipe end with its retained sealing ring and housing from the working surface of the mandrel.

5. The method of claim 4, wherein the amount the gripping insert is spaced apart is selected to cause the gripping insert to be initially received more closely within the housing circumferential interior region, whereby the teeth of the gripping insert are initially concealed in the housing circumferential interior region so that the placement of the spacer in the gripping insert prevents the insert from making detrimental contact with the outer working surface of the mandrel during the belling operations.

6. The method of claim 3, wherein the spacer is left in position during storage of the belled pipe end but is removed before pipe assembly in order to activate the sealing ring, companion ring shaped housing, and ring shaped gripping insert.

7. The method of claim 1, wherein the gripping insert exterior surface has a sloping profile which contacts a mating interior region of the housing, whereby contact with the exterior surface of a mating male plastic pipe causes the gripping insert to ride along the male surface at an angle while the row of gripping teeth on the gripping insert internal surface engage the exterior surface of the mating male plastic pipe.

8. The method of claim 7, wherein the housing has a rear wall region which is substantially perpendicular to a longitudinal axis of the female pipe, the rear wall region being in contact with the elastomeric body of the sealing ring as a mating male pipe is inserted into a mouth opening of the female plastic pipe, and wherein the housing exterior terminates in a tip region adjacent the rear wall region, the tip region serving to cover a portion of the companion sealing ring during belling operations.

9. The method of claim 7, wherein the housing exterior surface has at least one row of biting teeth for biting into an internal diameter of the female plastic pipe, the biting teeth being located on a region of the exterior surface which is forward of a vertical central axis of the housing.

10. The method of claim 1, wherein the housing is formed of a material selected from the group consisting of metals, composites and rigid elastomers or plastics.

11. The method of claim 1, wherein the sealing ring is formed from a material selected from the group consisting of natural and synthetic rubbers and elastomers, polymeric plastics and composites.

* * * * *